United States Patent [19]
Kuzma

[11] Patent Number: 5,951,637
[45] Date of Patent: Sep. 14, 1999

[54] BANDWIDTH RESERVATION SYSTEM

[75] Inventor: Andrew J. Kuzma, Portland, Oreg.

[73] Assignee: Intel Corporation, Santa Clara, Calif.

[21] Appl. No.: 08/852,387

[22] Filed: May 7, 1997

[51] Int. Cl.[6] ...................................................... G06F 13/00
[52] U.S. Cl. ........................... 709/204; 370/260; 379/202
[58] Field of Search ........................ 395/200.34, 200.35, 395/200.37, 200.78, 200.51, 200.61; 370/260, 261, 262, 263, 468; 379/202; 709/204, 219, 220, 221, 224, 226, 228

[56] References Cited

U.S. PATENT DOCUMENTS

| | | | |
|---|---|---|---|
| 5,065,392 | 11/1991 | Sibitt et al. | 370/360 |
| 5,065,393 | 11/1991 | Sibbitt et al. | 370/360 |
| 5,136,581 | 8/1992 | Muehrcke | 370/261 |
| 5,408,526 | 4/1995 | McFarland et al. | 379/202 |
| 5,483,587 | 1/1996 | Hogan et al. | 379/202 |
| 5,673,393 | 9/1997 | Marshall et al. | 370/260 |
| 5,680,392 | 10/1997 | Semaan | 370/261 |
| 5,732,078 | 3/1998 | Arango | 370/355 |

OTHER PUBLICATIONS

"Video Conferencing: Lucent Technologies Announces New Version of Multiport Conferencing Unit", Edge, V 11, p. 16(1), Oct. 28, 1996.

"SVC Signaling: Calling All Nodes", Data Communications, Jun. 1995, p. 123, vol. 24, No. 8.

"Worldlinx's Vis–A–Vis", by Deixler, Lyle, Teleconnect, V 12, n 9, p. 44(2), Sep. 1994.

*Primary Examiner*—Moustafa M. Meky
*Attorney, Agent, or Firm*—William H. Murray; N. Stephan Kinsella

[57] ABSTRACT

A system, method, apparatus, and storage medium for establishing a data conference with an end point of a communications network. According to one embodiment, a node requests from the end point a reserved bandwidth for a data conference having a specified start time. The originating end point receives confirmation of the reserved bandwidth from the end point. The originating end point establishes the data conference with the end point within a predetermined time window around the start time.

24 Claims, 2 Drawing Sheets

100

200

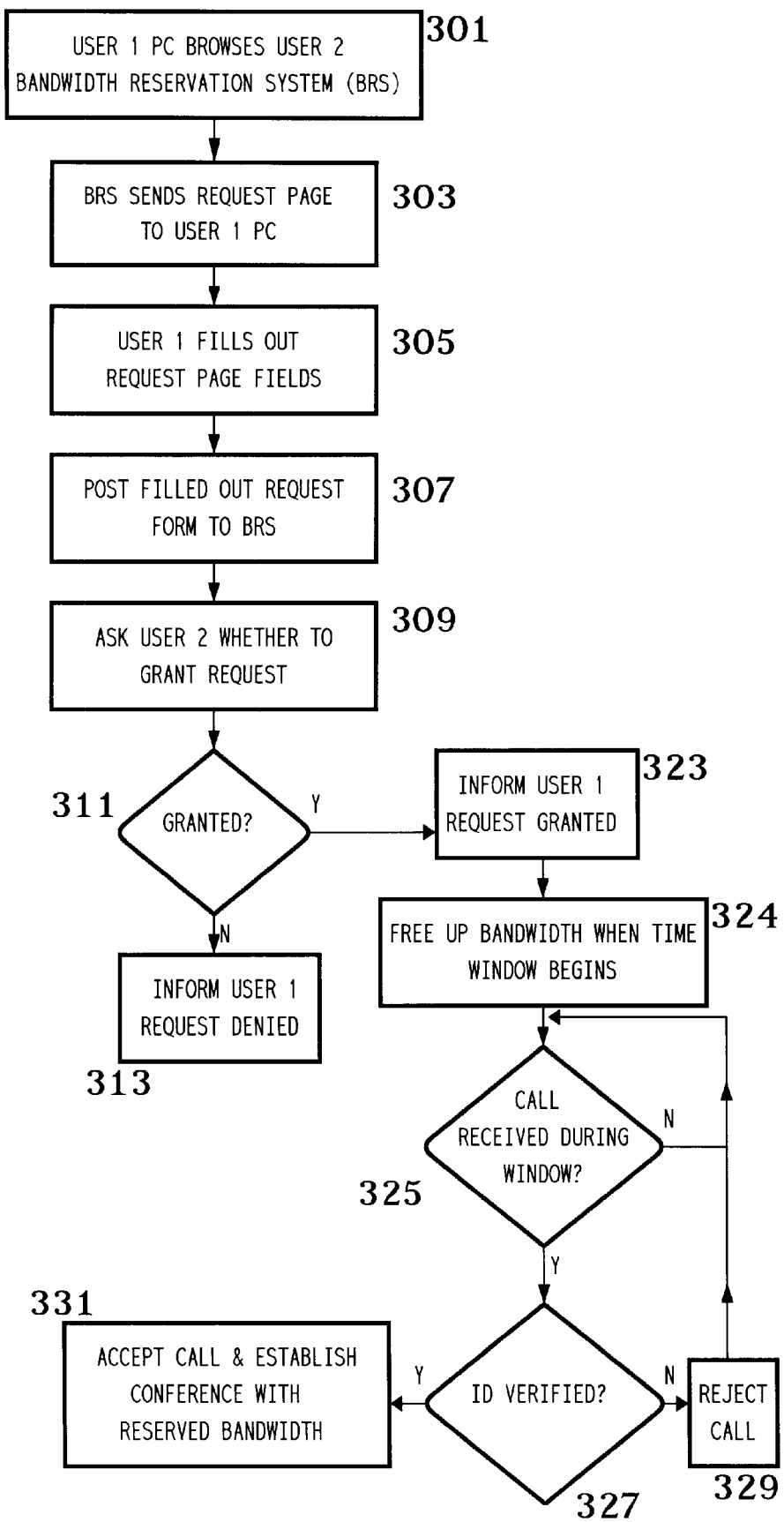

BANDWIDTH RESERVATION SYSTEM

BACKGROUND OF THE INVENTION

1. Field of the Invention

The present invention relates to the use of communications networks and, in particular, to the use of integrated services digital networks (ISDN).

2. Description of the Related Art

High-bandwidth communications networks such as ISDN are commonly used to communicate with specified end points or nodes of the network. ISDN lines and services are typically provided by ISDN providers, such as telephone companies. For example, a first user may desire to establish a data conference with at least a second user. In general, a data conference, sometimes also referred to as a video conference, is a conference in which the participants in the conference share audio, video, and other types of data on their respective local terminals. High-bandwidth communications may be required or desirable for such data conferences, so that audio, video, and other forms of data may be distributed to participants in the conference in real time.

A user having access to a high-bandwidth communications channel such as an ISDN line will often use the ISDN line for various communications purposes. For example, an ISDN connection may be made to the user's Internet service provider (ISP) to check email, browse sites on the world wide web (WWW), and the like. Such Internet-compatible communications may be made using H.323-compliant communications protocols and the transmission control protocol/Internet protocol (TCP/IP), a packet switching control protocol used for networks such as public networks (e.g., the Internet) and private networks (e.g. Intranets). A point-to-point data conference may also be established between two users over the Internet via the users' respective ISPs, using such H.323-compliant communications. Each user may have an ISDN connection to its respective ISP, which then establish a high-bandwidth connection with each other over the Internet.

Alternatively, instead of communicating through the Internet, a point-to-point data conference may be established directly through ISDN using H.320-compliant communications protocols. Such a direct use of ISDN does not involve the Internet or the users' ISPs, but is routed and switched in a manner similar to a standard POTS (plain old telephone system) telephone call, albeit with higher bandwidth. In addition to H.320 and H.323 connections, other International Telecommunication Union (ITU) Series H Recommendations protocols may be used for line transmission of non-telephone signals as well.

ISDN communication can be used for a variety of types of data transfer and bandwidth requirements. In an ISDN connection between two end points or users, the connection includes both a relatively low-bandwidth data channel (D channel) and typically one or two relatively high-bandwidth so-called "bearer" channels (B channels). Both B and D channels are full duplex digital communication channels. The D channel is used to switch on and control the use of B channels. To establish an ISDN connection, the D channel is used to access switch controlling to establish at least one B channel. A second B channel can be added as necessary for higher bandwidth data throughput, using the bandwidth allocation control protocol (BACP) of ISDN. For example, one B channel may be used for data and audio communications. If the users then desire to share video data as well, more bandwidth may be required, and a second B channel may be added to maintain the quality of the conference.

Unfortunately, if a first user attempts to call a second user to establish an ISDN connection with the second user, the second user may already be using all the spare capacity of his ISDN line. For example, the second user may be currently using the D channel and both B channels to engage in a conference with a third party, to access an ISP, or for another communications purpose. In this case, the first user may be unable to establish an ISDN connection with the second user with sufficient bandwidth to handle the planned use of the ISDN connection, or the first user may be unable to contact the second user at all, for example the equivalent of a busy signal may be received by the first user.

SUMMARY

The present invention is for establishing a data conference with an end point of a communications network. According to one embodiment of the invention, a node requests from the end point a reserved bandwidth for a data conference having a specified start time. The originating end point receives confirmation of the reserved bandwidth from the end point. The originating end point establishes the data conference with the end point within a predetermined time window around the start time.

BRIEF DESCRIPTION OF THE DRAWINGS

These and other features, aspects, and advantages of the present invention will become more fully apparent from the following description, appended claims, and accompanying drawings in which:

FIG. 3 is a flow diagram illustrating the method of operation of reserving bandwidth and establishing a bandwidth-reserved data conference with the systems of FIGS. 1 and 2, in accordance with an embodiment of the present invention.

DESCRIPTION OF THE PREFERRED EMBODIMENT

In the present invention, a bandwidth reservation system is provided in which a first user can cause a second user to reserve bandwidth for a scheduled point-to-point connection between the users, such as a data conference, as described in further detail below.

Networked Computer System

Figure 1:
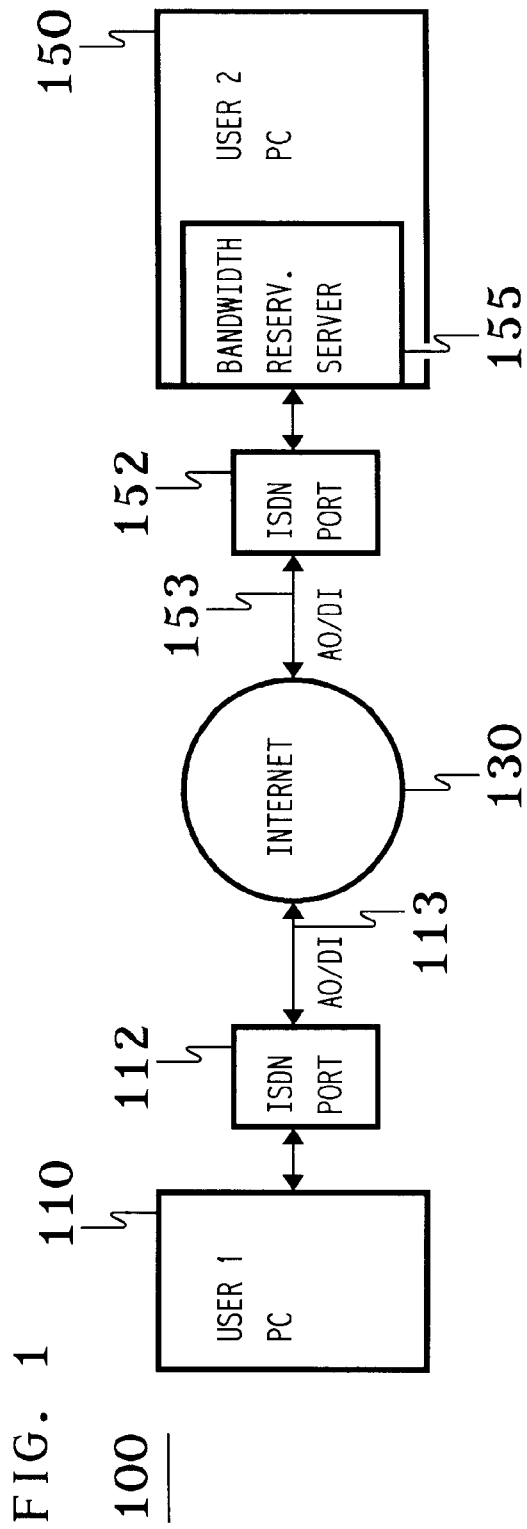
FIG. 1 shows a networked computer system for bandwidth reservation in accordance with an embodiment of the present invention.

Referring now to FIG. 1, there is shown networked computer system 100, in accordance with an embodiment of the present invention. Networked computer system 100 comprises a plurality of nodes or personal computers (PCs), including PCs 110 and 150. PCs 110 and 150 are associated with human users 1 and 2, respectively. In one embodiment, each PC 110, 150 of networked computer system comprises a processor, memory, video camera, microphone, mouse, speakers, and monitor (not shown). PCs 110 and 150 are each coupled via ISDN ports 112, 152, and ISDN lines 113, 153, respectively, to the Internet 130, for high-bandwidth communications across the Internet 130. PCs 110 and 150 may each run one or more servers for control of communication, such as web sessions, with other nodes over Internet 130. Each PC node or end point of Internet 130 may be reached by other nodes of Internet 130 at a unique URL (uniform resource locator) address. PC 150 hosts a bandwidth reservation server 155 that may be accessed at a particular URL by other nodes connected to the Internet.

X.25 SVC and AO/DI

In an embodiment of the present invention, PCs 110, 150 utilize always on/dynamic ISDN (AO/DI), a networking service that provides an always-available connection to TCP/IP services through the Internet 130. As explained above, in an ISDN connection, users have access to both a relatively low-bandwidth D channel and one or more relatively high-bandwidth B channels, where the D channel is used to switch on and control the use of B channels. To access an ISDN connection, the D channel is used to access switch controlling to establish at least one B channel. A second B channel can be added as necessary for higher bandwidth data throughput, using the ISDN's BACP.

ISDN also includes the X.25 packet switched network protocol, which can be used to provide a packet switched network connection through a D channel of ISDN. Such a connection may be referred to herein as an X.25 switched virtual circuit (SVC). Thus, a D channel of ISDN can be used for at least two distinct purposes: in addition to controlling usage of B channels during a standard ISDN connection, a D channel of ISDN can also be used to establish an X.25 SVC.

An X.25 SVC—and thus an ISDN D channel—can provide relatively low bandwidth data communications (e.g. basic ASCII email services, news feeds, and automated data collection). To establish an X.25 SVC, the X.25 protocol is used to pass an X.25-compatible message to a switch of the central office of the ISDN provider, to request an X.25 SVC to a specified end point. The X.25 protocol and related standards are described in Uyless Black, *X.25 and Related Protocols* (Los Alamitos, Calif.: IEEE Computer Society Press, 1991), ISBN 0-8186-8976-5; and in International Telecommunication Union (ITU) Recommendation X.25 (October 1996): "Interface between Data Terminal Equipment (DTE) and Data Circuit-terminating Equipment (DCE) for terminals operating in the packet mode and connected to public data networks by dedicated circuit." ISDN is described in the ITU's various Series I Recommendations.

In the present invention, AO/DI, which utilizes the X.25 capability of ISDN systems, is used to more efficiently utilize ISDN bandwidth. In an AO/DI system, an ISDN D channel X.25 call is placed from a user to an internet service provider (ISP). For example, as illustrated in FIG. 1, an AO/DI connection may be established between bandwidth reservation server 155 and the Internet 130, over ISDN line 153. In AO/DI, the X.25 SVC (established over the D channel of ISDN) is left always on, and B channels are invoked when necessary via the BACP for higher bandwidth communications. This avoids the waste of bandwidth that occurs when users "camp on" B channels of ISDN for extended periods of time. TCP/IP-compatible communications, such as web sessions, may also be implemented via the X.25 SVC of AO/DI, since the TCP/IP protocol is encapsulated within the X.25 logical circuit carried by the D channel of ISDN.

For example, to communicate using AO/DI, PC 110 places an X.25 SVC call over Internet 130 to its ISP (not shown). PC 110 can thus receive low-bandwidth information at any time from its ISP, such as email or other notifications, without having to periodically connect to check for waiting information, and without having to continuously tie up a higher-bandwidth B channel. Rather, when the X.25 SVC bandwidth is not sufficient and additional bandwidth is needed, the appropriate telephone numbers are exchanged between the user's and ISP's equipment to allow one or more B channels to be dialed and established. The B channels are routed through the switched fabric of the switching offices of ISDN and other communications channel providers of the Internet 130. Thus, using only a D channel X.25 SVC, two end points or nodes of Internet 130 can engage in TCP/IP communications.

If a user were to "camp on" with a full ISDN connection, which involves at least one B channel, much bandwidth would be wasted during times when not much information is being transmitted over the ISDN connection. Alternatively, if a user did not always have a connection on and only made a full ISDN connection periodically, for example once every hour, then the user's PC could not respond in real time to incoming call, information requests, information updates, and the like. Therefore, the use of AO/DI enables always-on availability of a given endpoint over a network, without wasting a large amount of bandwidth during low throughput time periods. However, communication over a D channel X.25 SVC has limited applications, since the bandwidth of a D channel is relatively low, at 16 kbps total with 9600 bps guaranteed X.25 frame throughput. To improve the low bandwidth of a D channel X.25 circuit, BACP messages are used to add B channels on demand. The B channels are invoked to temporarily boost data throughput, and are then disconnected.

Bandwidth Reservation

As explained above, a first user may be unable to establish an ISDN connection with a second user with sufficient bandwidth to handle the planned use of an ISDN connection, if the second user is already using too much ISDN bandwidth. Accordingly, in the present invention, a bandwidth reservation system is provided in which a first user can cause a second user to reserve bandwidth for a scheduled point-to-point connection between the users.

Figure 2:
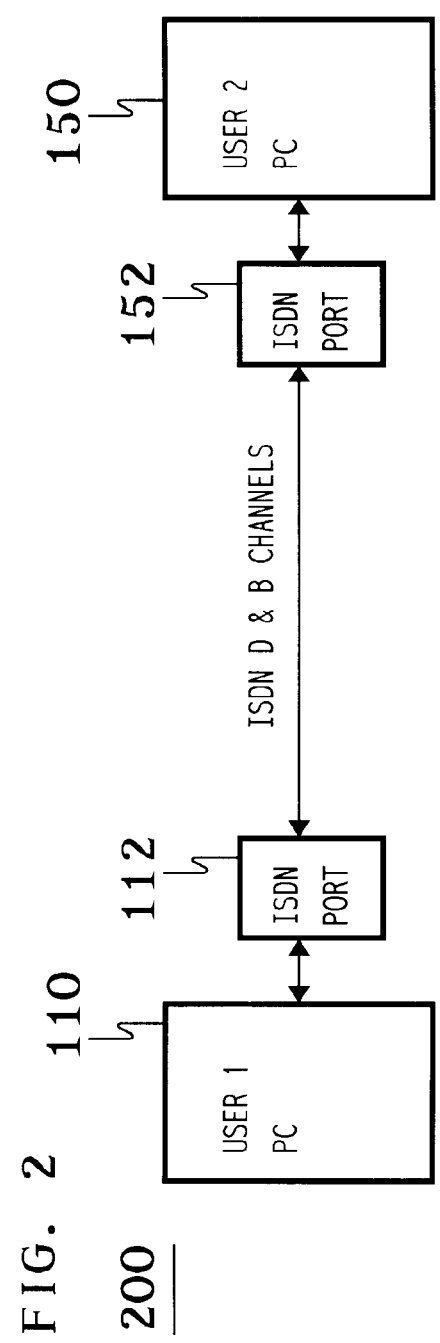
FIG. 2 shows a networked computer system in which a bandwidth-reserved data conferencing session involving the personal computers of the networked computer system of FIG. 1 is established in accordance with an embodiment of the present invention.

Referring now to FIG. 3, there is shown a flow diagram 300 illustrating the method of operation of reserving bandwidth and establishing a bandwidth-reserved data conference with the networked computer systems of FIGS. 1 and 2, in accordance with an embodiment of the present invention. Bandwidth reservation server 155 of PC 150 is connected by an AO/DI connection to the Internet 130. If user 1 wishes establish a connection such as a video conference, at some future time, with user 2, user 1 uses PC 110 to browse the bandwidth reservation server 155 of PC 150 (step 301 of FIG. 3). This may be done by PC 110 contacting the URL of bandwidth reservation server 155 over Internet 130. Since bandwidth reservation server 155 has an AO/DI connection to the Internet 130, it can respond nearly instantaneously to the browse by PC 110. PC 110 may also be using AO/DI via its ISDN line 113. As will be appreciated, PC 110 and PC 150 each are nodes or end points of Internet 130. However, for convenience of reference, PC 110 may be referred to as a node and PC 150 may be referred to as an end point.

In response to the browse by PC 110, bandwidth reservation server 155 transmits an HTML bandwidth reservation request page over the X.25 SVC to the Internet 130, which then routes the request page to PC 110 (step 303). The page contains links that allow PC 110 to request a scheduled data conference with PC 150 at a particular future time. For example, the request page may contain a form with fields for the time of call that will start the conference, identity of user 1, type of call (e.g. video, audio, data, and the like), expected length of the conference, type of medium (e.g. an H.323- compliant conference over the WWW or an H.320-compliant data conference established directly through ISDN), and the like. The requested conference may require that both ISDN B channels of PC 150's ISDN line 153 be available, for example. User 1 or PC 110 fills in the appropriate fields in the request page, for example requesting a data conference capable of sharing audio and video, at a specified time (step 305). For example, the current time may be 10:00 a.m., and user 1 may request a data conference at 1:30 p.m. the same day in the request form. The data-value pairs of the filled-out request form is posted back to bandwidth reservation server 155 of PC 150 over the X.25 SVC (step 307). In another embodiment of the present invention, PC 110 fills out the form automatically and posts it back to bandwidth reservation server 155 of PC 150, without requesting user 1 to fill out the request form.

PC 150 then determines whether or not to grant the bandwidth reservation request. For example, PC 150 may display a message on the screen of PC 150, informing user 2 of the request for a data conference at a specified time with user 1 (step 309). If user 2 denies the request, for example because the proposed data conference time is inconvenient, PC 150 sends a message to PC 110 notifying PC 110 that the request has been rejected (steps 311, 313). If, however, user 1 accepts the request, then PC 150 reserves bandwidth locally for a window of time around the specified time, for example for a ten-minute window plus or minus five minutes from the specified time (i.e., from 1:25 p.m. to 1:35 p.m.), during which PC 110 may initiate the conference (steps 324–331, discussed below).

After the bandwidth reservation request is accepted, PC 150 notifies PC 110 that the request has been granted (step 323). This notification can include the connection number that PC 110 is to call at the specified time, supply a unique conference or session identifier that PC 150 has generated, and indicate the time window during which the bandwidth has been reserved for PC 110 to attempt to initiate the conference. In an alternative embodiment, steps 309 and 311 can be performed automatically by PC 150, for example PC 150 may automatically grant any request after consulting a local calendar program, if the proposed conference time is within regular business hours and does not conflict with any pre-scheduled time as indicated by the local calendar program.

When the time window later begins, i.e. at 1:25 p.m., PC 150 ensures that the reserved bandwidth is freed up (step 324), so that the requested bandwidth will be available when PC 110 calls. Since in the current example both B channels have been reserved, then any current use of either B channel is terminated. Thus, for example, if user 2 is using one of the channels for a telephone call or other conference, PC 150 can flash a warning notifying user 2 that the call or conference must be (or automatically will be) terminated. Alternatively, one or more B channels may be currently being used for web-browsing purposes. In this case, the B channels are held open and not allowed to be used for web-browsing or any other use. This can result in decreased throughput for any current web session, which is traded off against the benefit of reserving the extra bandwidth of the B channels for the expected incoming call from PC 110 or user 1.

In an alternative embodiment, PC 150 begins to free up the reserved bandwidth some predetermined time before the time window begins, for example to give user 1 adequate time to terminate other uses of the required bandwidth with minimum disruption. Thus, if the 10-minute time window during which bandwidth is to be freed up for an incoming call from PC 110 begins at 1:25 p.m., at 1:20 p.m. PC 150 can initiate the process of freeing up the bandwidth reserved for the time window.

If a call is received during the time window (step 325), then PC 150 determines whether or not to accept the call, depending on whether or not this is the scheduled call. Accordingly, PC 150 determines whether the caller has supplied the previously-generated session ID (step 327). If the appropriate session ID is not supplied, then PC 150 determines that the call is not from PC 110 and should thus be rejected so that when the call comes in from PC 110 the reserved bandwidth requested will be available. In this event, the call is rejected (step 329) and PC 150 continues waiting during the time window for further calls.

If and when PC 110 does call during the time window, the correct ID will be provided to PC 150, since this ID was previously supplied to PC 110 during the bandwidth reservation process, and the ID will accordingly be verified (step 327). In this case the call is accepted and the data conference is established (step 331). As will be understood, the data conference may be one of several types, including an H.323-compliant conference over the WWW or an H.320-compliant data conference established directly through ISDN. In either case at least one ISDN B channel circuit mode connection is set up between the two users through the desired type of communications protocol and medium. An established ISDN B channel circuit mode connection is illustrated in FIG. 2, which shows a networked computer system 200 in which a bandwidth-reserved data conferencing session involving the personal computers 110, 150 of networked computer system 100 of FIG. 1 is established in accordance with an embodiment of the present invention.

Thus, in accordance with the present invention a first user may reserve bandwidth with a second user prior to attempting a data conference with the second user. This ensures that adequate bandwidth on the second user's side of the conference will be available when the first user establishes the data conference, as opposed to previous systems in which the first user's attempt could be denied altogether by a "busy signal," or in which too much bandwidth would already be allocated by the second user's computer system.

In the present invention, as long as the two users or end points agree on the bandwidth reservation, there is no need to obtain the explicit agreement of intervening nodes of the network, such as the Internet 130 or other communications network, since ISDN connections do not require such agreement of intervening network nodes in order to guarantee the availability of a connection.

In an alternative embodiment of the present invention, instead of a dedicated bandwidth reservation server 155, PC 150 may have a general-purpose web server or home page, which contains a hyperlink that a browsing user can click on, which then causes the web server to transmit the HTML request page to the browsing user.

In an another embodiment PCs 110 and 150 may be coupled, for purposes of bandwidth reservation, by a communications medium or network other than the Internet 130, such as an Intranet or wide-area network (WAN).

In yet another embodiment of the present invention, PC 110 accesses bandwidth reservation server 155 to attempt to establish an immediate data conference, rather than one scheduled some time in the future. This may be useful since a direct call via ISDN to PC 150 may be rejected by a "busy signal," but the bandwidth reservation request can be transmitted because the AO/DI connection of bandwidth reservation server 155 allows it to grant such a request even if it is currently using both ISDN B channels. In this case, the use of AO/DI and bandwidth reservation can be used to establish a data conference with sufficient bandwidth, when the data conference call would otherwise fail due to the necessary bandwidth being already allocated for other uses.

As will be understood, the present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer or by a distributed network of computers, the computer or network becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. Thus, for example, each PC 110 and 150 may store instructions in its respective memory for execution by its respective processor to implement the steps of the present invention as described above.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for establishing a data conference between a node and an end point of a communication network, comprising the steps of:
    (a) requesting from the end point a reserved bandwidth for a data conference having a specified start time;
    (b) receiving confirmation of the reserved bandwidth from the end point, wherein, during a predetermined time window around the start time, the end point terminates or rejects other uses of the reserved bandwidth to ensure that the reserved bandwidth is available for the data conference; and
    (c) establishing the data conference with the end point within the predetermined time window.

2. The method of claim 1, wherein step (a) comprises the steps of:
    (1) establishing a web session with a web server of the end point;
    (2) requesting a bandwidth reservation request page from the end point;
    (3) receiving the bandwidth reservation request page from the end point, the request page containing a plurality of fields related to the bandwidth required for the data conference; and
    (4) transmitting to the end point data for the plurality of fields.

3. The method of claim 1, wherein the data conference is one of an H.323-compliant data conference established over the Internet and an H.320-compliant data conference established directly through ISDN using at least one ISDN B channel.

4. The method of claim 1, wherein the confirmation includes a conference identifier (ID).

5. The method of claim 4, wherein step (c) comprises the steps of:
    (1) calling the end point; and
    (2) providing the conference ID to the end point.

6. The method of claim 1, wherein the request of step (a) and the confirmation of step (b) are transmitted via an ISDN D channel X.25 switched virtual circuit.

7. The method of claim 6, wherein the node and the end point each have an always-on, dynamic ISDN connection to the network.

8. The method of claim 1, wherein step (b) comprises the steps of:
    (1) receiving, with the end point, the request in step (a) for the reserved bandwidth for the data conference from the node;
    (2) determining whether to accept the request; and
    (3) transmitting the confirmation to the node if the request is accepted in step (b)(2).

9. The method of claim 1, wherein step (a) comprises the step of requesting from the end point a reserved bandwidth for an immediate data conference, wherein the start time is at or near the current time at which the request is made.

10. The method of claim 1, wherein step (c) comprises the steps of:
    (1) freeing up the reserved bandwidth, with the end point, at or near the beginning of the time window; and
    (2) rejecting calls placed to the end point during the time window except for a call from the node.

11. A system for establishing a data conference over a communications network, comprising:
    (a) an end point of the network; and
    (b) a node of the network for requesting from the end point a reserved bandwidth for a data conference having a specified start time, for receiving confirmation of the reserved bandwidth from the end point, and for establishing the data conference with the end point within a predetermined time window around the start time, wherein, during the predetermined time window, the end point terminates or rejects other uses of the reserved bandwidth to ensure that the reserved bandwidth is available for the data conference.

12. The system of claim 11, wherein the node requests from the end point the reserved bandwidth by:
    (1) establishing a web session with a web server of the end point;
    (2) requesting a bandwidth reservation request page from the end point;
    (3) receiving the bandwidth reservation request page from the end point, the request page containing a plurality of fields related to the bandwidth required for the data conference; and
    (4) transmitting to the end point data for the plurality of fields.

13. The system of claim 11, wherein the data conference is one of an H.323-compliant data conference established over the Internet and an H.320-compliant data conference established directly through ISDN using at least one ISDN B channel.

14. The system of claim 11, wherein the confirmation includes a conference ID.

15. The system of claim 14, wherein the node establishes the data conference with the end point by:
    (1) calling the end point; and
    (2) providing the conference ID to the end point.

16. The system of claim 11, wherein the request for and the confirmation of the reserved bandwidth are transmitted via an ISDN D channel X.25 switched virtual circuit.

17. The system of claim 16, wherein the node and the end point each have an always-on, dynamic ISDN connection to the network.

18. The system of claim 11, wherein the end point is for:
 (1) receiving the request for the reserved bandwidth from the node;
 (2) determining whether to accept the request; and
 (3) transmitting the confirmation to the node if the request is accepted.

19. The system of claim 11, wherein the end point establishes the data conference with the node by:
 (1) freeing up the reserved bandwidth at or near the beginning of the time window; and
 (2) rejecting calls received during the time window except for a call from the node.

20. A node of a communicates network, the node comprising:
 a communications port through which communicates with other end points of the communications network is effected;
 a storage device having stored therein a plurality of instructions for establishing a data conference between the node and an end point of the communications network; and
 a processor coupled to the communications port and to the storage device for executing the plurality of instructions, wherein the processor, via the communications port:
 (a) requests a reserved bandwidth for a data conference having a specified start time from the end point;
 (b) receives a confirmation of the reserved bandwidth from the end point, wherein, during a predetermined time window around the start time, the end point terminates or rejects other uses of the reserved bandwidth to ensure that the reserved bandwidth is available for the data conference; and
 (c) establishes the data conference with the end point within the predetermined time window.

21. A storage medium having stored thereon a plurality of instructions, wherein the plurality of instructions, when executed by a processor of a node of a communications network, cause the processor to perform the steps of:
 (a) requesting from an end point of the communications network a reserved bandwidth for a data conference between the node and the end point having a specified start time;
 (b) receiving confirmation of the reserved bandwidth from the end point, wherein, during a predetermined time window around the start time, the end point terminates or rejects other uses of the reserved bandwidth to ensure that the reserved bandwidth is available for the data conference; and
 (c) establishing the data conference with the end point within the predetermined time window.

22. In a end point of a communication network, a method for establishing a data conference with a node of the communications network, the method comprising the steps of:
 (a) receiving a request from the node for a reserved bandwidth for a data conference having a specified start time;
 (b) determining whether to accept the request;
 (c) transmitting confirmation of the reserved bandwidth to the node if the request is accepted in step (b);
 (d) freeing up the reserved bandwidth at or near the beginning of the time window by terminating or rejecting other uses of the reserved bandwidth to ensure that the reserved bandwidth is available for the data conference; and
 (e) rejecting calls received during the time window except for a call from the node.

23. An end point of a communications network the end point comprising:
 a communications port through which communications with other end points and nodes of the communications network is effected;
 a storage device having stored therein a plurality of instructions for reserving bandwidth for a data conference with a node of the communications network; and
 a processor coupled to the communications port and to the storage device for executing the plurality of instructions, wherein the processor, via the communications port:
 (a) receives a request from the node for a reserved bandwidth for a data conference having a specified start time;
 (b) determines whether to accept the request;
 (c) transmits a confirmation of the reserved bandwidth to the node if the request is accepted;
 (d) frees up the reserved bandwidth at or near the beginning of the time window by terminating or rejecting other uses of the reserved bandwidth to ensure that the reserved bandwidth is available for the data conference; and
 (e) rejects calls received during the time window except for a call from the node.

24. A storage medium having stored thereon a plurality of instructions, wherein the plurality of instructions, when executed by a processor of an end point of a communications network, cause the processor to perform the steps of:
 (a) receiving a request from a node of the communications network for a reserved bandwidth for a data conference having a specified start time;
 (b) determining whether to accept the request;
 (c) transmitting confirmation of the reserved bandwidth to the node if the request is accepted in step (b);
 (d) freeing up the reserved bandwidth at or near the beginning of the time window by terminating or rejecting other uses of the reserved bandwidth to ensure that the reserved bandwidth is available for the data conference; and
 (e) rejecting calls received during the time window except for a call from the node.

* * * * *